United States Patent
Sasaki et al.

(10) Patent No.: US 10,914,369 B2
(45) Date of Patent: Feb. 9, 2021

(54) LUBRICATION STRUCTURE OF POWER TRANSMISSION DEVICE

(71) Applicant: HONDA MOTOR CO., LTD., Tokyo (JP)

(72) Inventors: Yuto Sasaki, Wako (JP); Hiroyuki Kita, Wako (JP); Tooru Yamashita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 429 days.

(21) Appl. No.: 15/896,068

(22) Filed: Feb. 14, 2018

(65) Prior Publication Data
US 2018/0274656 A1    Sep. 27, 2018

(30) Foreign Application Priority Data

Mar. 21, 2017  (JP) .................... 2017-055169

(51) Int. Cl.
*F16H 57/04*  (2010.01)

(52) U.S. Cl.
CPC ..... *F16H 57/0404* (2013.01); *F16H 57/0421* (2013.01)

(58) Field of Classification Search
CPC .......... F16H 57/0404; F16H 57/0421
See application file for complete search history.

(56) References Cited

U.S. PATENT DOCUMENTS

| 2,049,234 | A | * | 7/1936 | Thomas | F16H 57/0421 |
| | | | | | 184/11.1 |
| 2,767,736 | A | * | 10/1956 | Lackinger | F15B 1/26 |
| | | | | | 137/574 |
| 3,189,126 | A | * | 6/1965 | May | F01M 11/065 |
| | | | | | 184/6.2 |
| 4,397,333 | A | * | 8/1983 | Liba | B60K 15/077 |
| | | | | | 123/514 |

(Continued)

FOREIGN PATENT DOCUMENTS

| JP | 2009-264393 | 11/2009 |
| JP | 2010-242829 | 10/2010 |
| JP | 2014-119084 | 6/2014 |

OTHER PUBLICATIONS

Japanese Office Action for corresponding JP Application No. 2017-055169, dated Sep. 4, 2018.

*Primary Examiner* — Michael A Riegelman
(74) *Attorney, Agent, or Firm* — Mori & Ward, LLP

(57) ABSTRACT

A lubrication structure of a power transmission device, includes a housing including a bottom space to store lubricating fluid in which a rotating body is immersed to be lubricated, a partition dividing the bottom space into a first space in which a rotating body is provided and a second space opening to the first space, a tubular duct including a projection duct projecting in a projection direction from an end of the first space to the second space such that the first space and the second space communicate with each other via the tubular duct, and a strainer provided in the second space and including a suction inlet through which the strainer is (Continued)

configured to suction the lubricating fluid stored in the bottom space, the suction inlet being located between the end of the first space and a tip end of the projection duct in the projection direction.

8 Claims, 12 Drawing Sheets

(56) References Cited

U.S. PATENT DOCUMENTS

| | | | | |
|---|---|---|---|---|
| 4,616,609 A | * | 10/1986 | Munch | F01M 1/02 |
| | | | | 123/196 AB |
| 4,903,798 A | * | 2/1990 | Takemoto | F16H 57/0421 |
| | | | | 184/6.12 |
| 4,909,203 A | * | 3/1990 | Fukuo | F01M 11/065 |
| | | | | 123/196 R |
| 4,938,184 A | * | 7/1990 | Martin | F01M 11/0004 |
| | | | | 123/195 C |
| 5,103,782 A | * | 4/1992 | Matsui | F01M 11/0004 |
| | | | | 123/195 C |
| 5,301,642 A | * | 4/1994 | Matsushiro | F01M 5/001 |
| | | | | 123/142.5 R |
| 6,568,509 B1 | * | 5/2003 | Sugiura | F01M 11/0004 |
| | | | | 184/106 |
| 9,625,029 B2 | * | 4/2017 | Vituri | F16H 57/029 |
| 2009/0020366 A1 | * | 1/2009 | Mori | F01M 11/0004 |
| | | | | 184/106 |
| 2010/0029430 A1 | * | 2/2010 | Tokai | F16H 57/0447 |
| | | | | 475/160 |
| 2018/0045295 A1 | * | 2/2018 | Kiyokami | B60K 6/445 |
| 2018/0266538 A1 | * | 9/2018 | Kita | F16H 57/0483 |
| 2018/0274656 A1 | * | 9/2018 | Sasaki | F16H 57/0421 |
| 2018/0274658 A1 | * | 9/2018 | Iizuka | F16H 57/0404 |

* cited by examiner

FIG. 4

| | C1 | C2 | C3 | B1 | B2 | B3 | F1 | TRANSMISSION GEAR RATIO | GEOMETRIC RATIO |
|---|---|---|---|---|---|---|---|---|---|
| Rvs | | | ○ | | ○ | | L | 4.008 | |
| 1st | | | | ○ | (○) | | R/L | 5.233 | |
| 2nd | | ○ | | ○ | ○ | | R | 3.367 | 1.554 |
| 3rd | | | ○ | ○ | ○ | | R | 2.298 | 1.465 |
| 4th | | ○ | ○ | ○ | | | R | 1.705 | 1.348 |
| 5th | ○ | | (○) | ○ | | | R | 1.363 | 1.251 |
| 6th | ○ | ○ | ○ | | | | R | 1.000 | 1.363 |
| 7th | ○ | | ○ | | ○ | | R | 0.786 | 1.273 |
| 8th | ○ | ○ | | | ○ | | R | 0.657 | 1.196 |
| 9th | ○ | | | | ○ | ○ | R | 0.584 | 1.126 |
| 10th | ○ | ○ | | | | ○ | R | 0.520 | 1.120 |

LUBRICATION STRUCTURE OF POWER TRANSMISSION DEVICE

CROSS-REFERENCE TO RELATED APPLICATIONS

The present application claims priority under 35 U.S.C. § 119 to Japanese Patent Application No. 2017-055169, filed Mar. 21, 2017, entitled "Lubrication Structure of Power Transmission Device." The contents of this application are incorporated herein by reference in their entirety.

BACKGROUND

1. Field

The present disclosure relates to a lubrication structure of a power transmission device.

2. Description of the Related Art

Some existing power transmission devices mounted on a vehicle or the like include a transmission that outputs driving power of an internal combustion engine while changing gears, a differential device that distributes the driving power output from transmission to left and right driving wheels, and a transfer device that distributes the driving power transmitted to the differential device to other driving wheels that are located in the front-back direction.

An existing power transmission device of this type (see, for example, Japanese Unexamined Patent Application Publication No. 2010-242829) includes a lubrication structure that lubricates a final driven gear (rotating body) by immersing the final driven gear in an oil sump (fluid sump) of lubricating oil (lubricating fluid) collected in a housing.

In such a power transmission device, in general, a pump suctions the lubricating oil collected in the housing via a strainer, and the lubricating oil is supplied to components of the power transmission device to lubricate the components or is used to generate a hydraulic pressure for a hydraulic device.

If the pump suctions air together with the lubricating oil, for example, a trouble, such as a failure to supply a required hydraulic pressure, may occur. Therefore, the position of the strainer or the amount of lubricating oil is set so that a suction inlet of the strainer is constantly immersed in the oil sump.

SUMMARY

According to one aspect of the present invention, a lubrication structure of a power transmission device is a lubrication structure for lubricating a rotating body by immersing the rotating body in a fluid sump of lubricating fluid collected in a housing of the power transmission device. The lubrication structure includes a strainer disposed in a lower part of a space in the housing; a partition member that divides the space in the housing into portions; and a tubular duct through which the portions of the space divided by the partition member communicate with each other. The strainer includes a suction inlet through which the lubricating fluid is suctioned from the fluid sump. The partition member defines, by dividing the space in the housing, a first chamber that contains the rotating body and a second chamber that communicates with the first chamber through an upper part of the space in the housing and contains the strainer. The suction inlet of the strainer is located closer to the first chamber than an opening of the duct in the second chamber is.

According to another aspect of the present invention, a lubrication structure of a power transmission device, includes a housing including a bottom space to store lubricating fluid in which a rotating body is immersed to be lubricated, a partition dividing the bottom space into a first space in which a rotating body is provided and a second space opening to the first space, a tubular duct including a projection duct projecting in a projection direction from an end of the first space to the second space such that the first space and the second space communicate with each other via the tubular duct, and a strainer provided in the second space and including a suction inlet through which the strainer is configured to suction the lubricating fluid stored in the bottom space, the suction inlet being located between the end of the first space and a tip end of the projection duct in the projection direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 4 is a table showing engagement states of engagement mechanisms of the transmission shown in FIG. 2 for respective gears.

DESCRIPTION OF THE EMBODIMENTS

Figure 1:
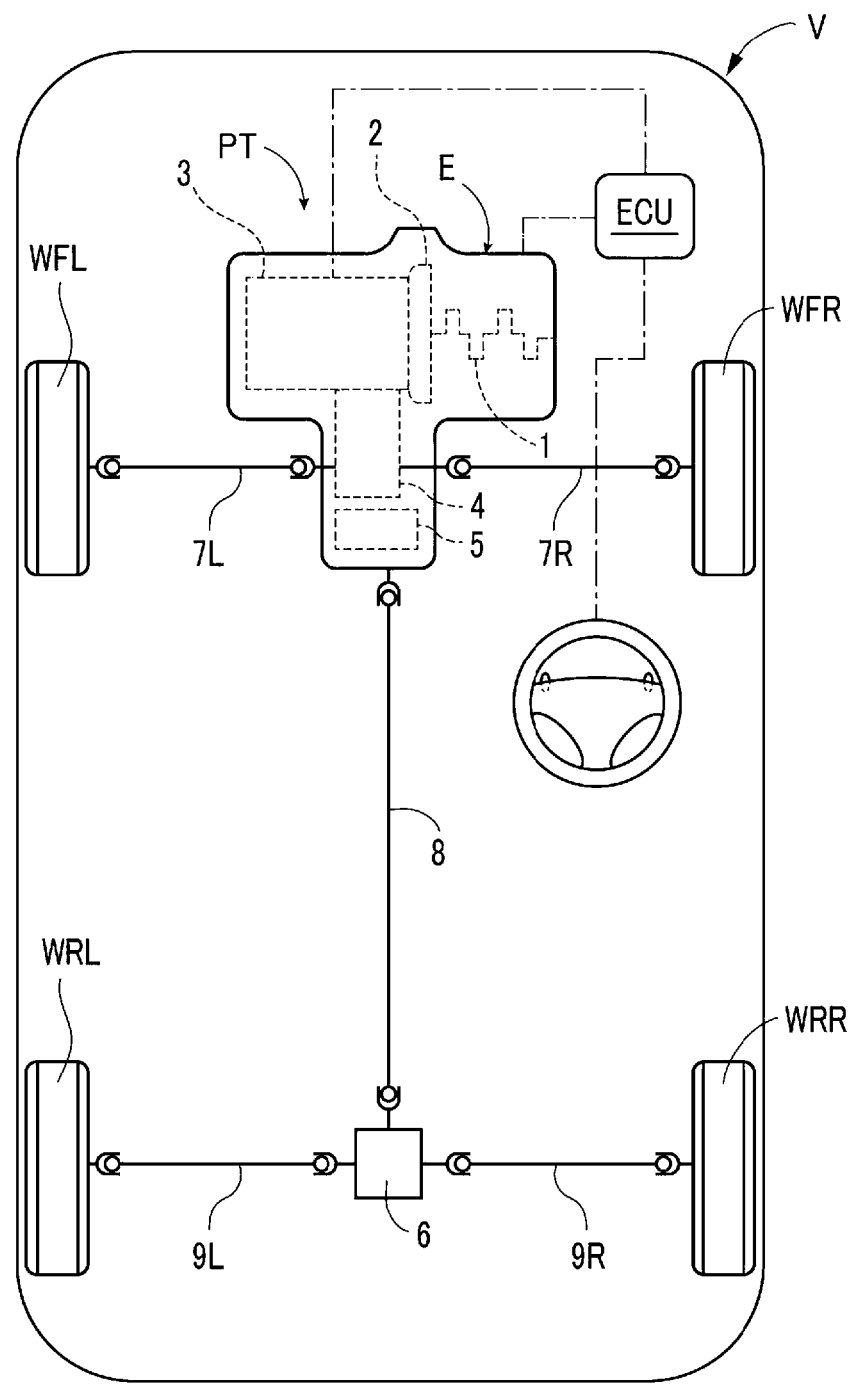
FIG. 1 is a schematic view of a vehicle in which a power transmission device including a lubrication structure according to an embodiment is mounted.

The embodiments will now be described with reference to the accompanying drawings, wherein like reference numerals designate corresponding or identical elements throughout the various drawings.

Hereinafter, a vehicle in which a power transmission device including a lubrication structure according to an embodiment is mounted will be described with reference to the drawings.

As illustrated in FIG. 1, an engine E (internal combustion engine, drive source) is transversally mounted in a vehicle V so that a crankshaft 1 extends in the left-right direction of the body of the vehicle V. Driving power of the engine E is transmitted via a power transmission device PT to a left front wheel WFL, a right front wheel WFR, a left rear wheel WRL, and a right rear wheel WRR.

The power transmission device PT includes a torque converter 2 connected to the crankshaft 1, a transmission 3 connected to the torque converter 2, a front differential gear 4 (differential device) connected to the transmission 3, a transfer device 5 connected to the front differential gear 4, and a rear differential gear 6 connected to the transfer device 5.

The front differential gear 4 is connected to the left front wheel WFL and the right front wheel WFR via a left front axle 7L and a right front axle 7R. The rear differential gear 6 is connected to the transfer device 5 via a propeller shaft 8 and is connected to the left rear wheel WRL and the right rear wheel WRR via a left rear axle 9L and a right rear axle 9R.

Figure 2:
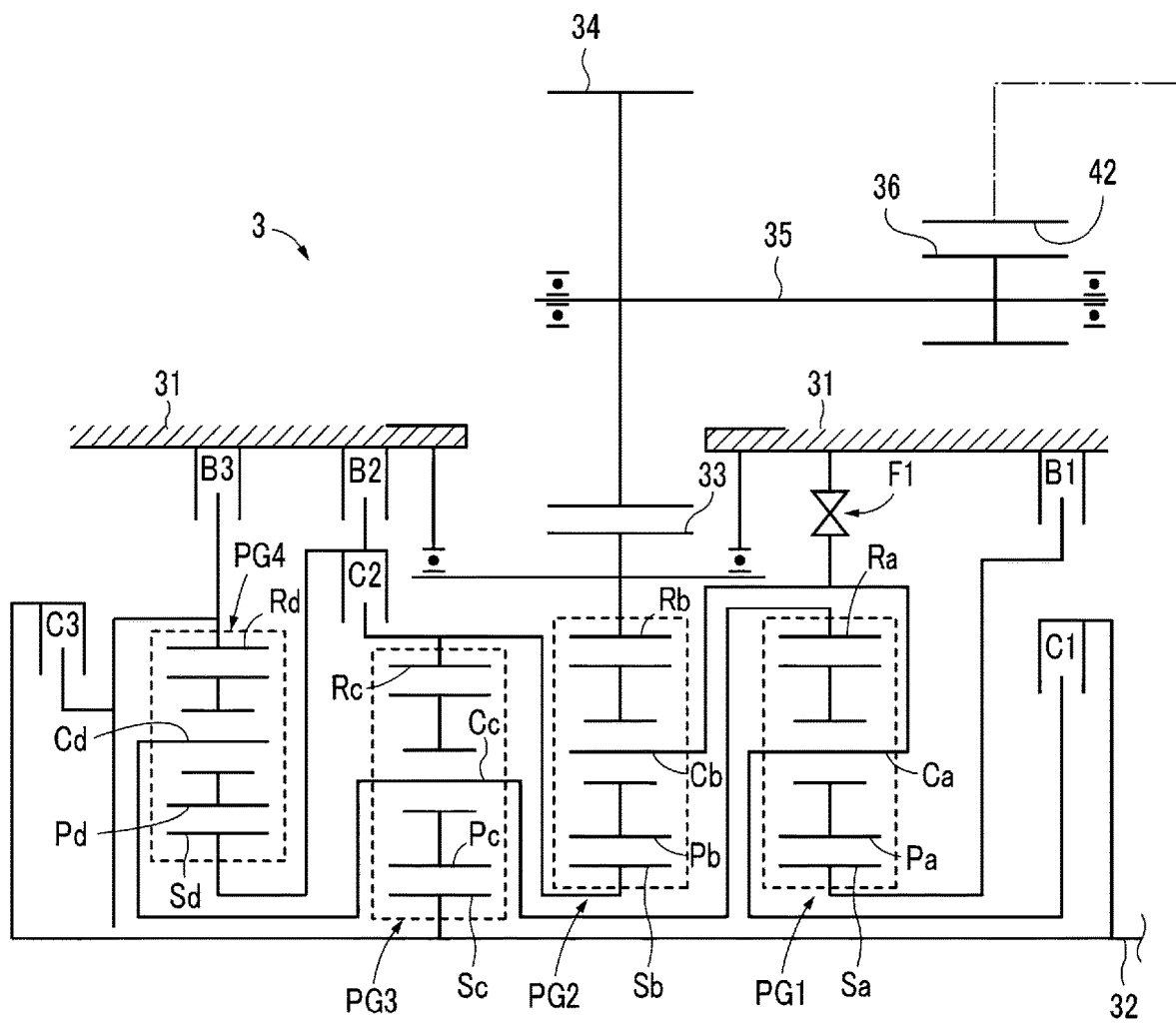
FIG. 2 is a skeleton diagram of a transmission mounted in the vehicle shown in FIG. 1.

As shown in the skeleton diagram of FIG. 2, the transmission 3 includes an input shaft 32 that is rotatably supported in a transmission case 31 (housing), and an output member 33 including an output gear that is disposed coaxially with the input shaft 32.

Driving power output from the engine E is transmitted to the input shaft 32 via the torque converter 2, which includes a lock-up clutch and a damper.

Rotation of the output member 33 is transmitted to the left front wheel WFL and the right front wheel WFR (see FIG. 1) via an idling gear 34 that meshes with the output member 33, an idling shaft 35 that rotatably supports the idling gear 34, a final drive gear 36 that is rotatably supported by the idling shaft 35, and a final driven gear 42 (that is, the front differential gear 4) that meshes with the final drive gear 36.

The power transmission device PT may include, instead of the torque converter 2, a single-disc starting clutch or a multi-disc starting clutch that is configured to be frictionally engageable.

In the transmission case 31, in order from the engine E side, a first planetary gear mechanism PG1, a second planetary gear mechanism PG2, a third planetary gear mechanism PG3, and a fourth planetary gear mechanism PG4 are arranged so as to be coaxial with the input shaft 32.

The third planetary gear mechanism PG3 is a single-pinion planetary gear mechanism including a sun gear Sc, a ring gear Rc, and a carrier Cc that rotatably and revolvably supports a pinion Pc that meshes with the sun gear Sc and the ring gear Rc.

A single-pinion planetary gear mechanism is also called a minus planetary gear mechanism or a negative planetary gear mechanism because, when the carrier is fixed and the sun gear is rotated, the ring gear rotates in a direction different from the direction in which the sun gear rotates. Note that, in a single-pinion planetary gear mechanism, when the ring gear is fixed and the sun gear is rotated, the carrier rotates in a direction the same as the direction in which the sun gear rotates.

Figure 3:
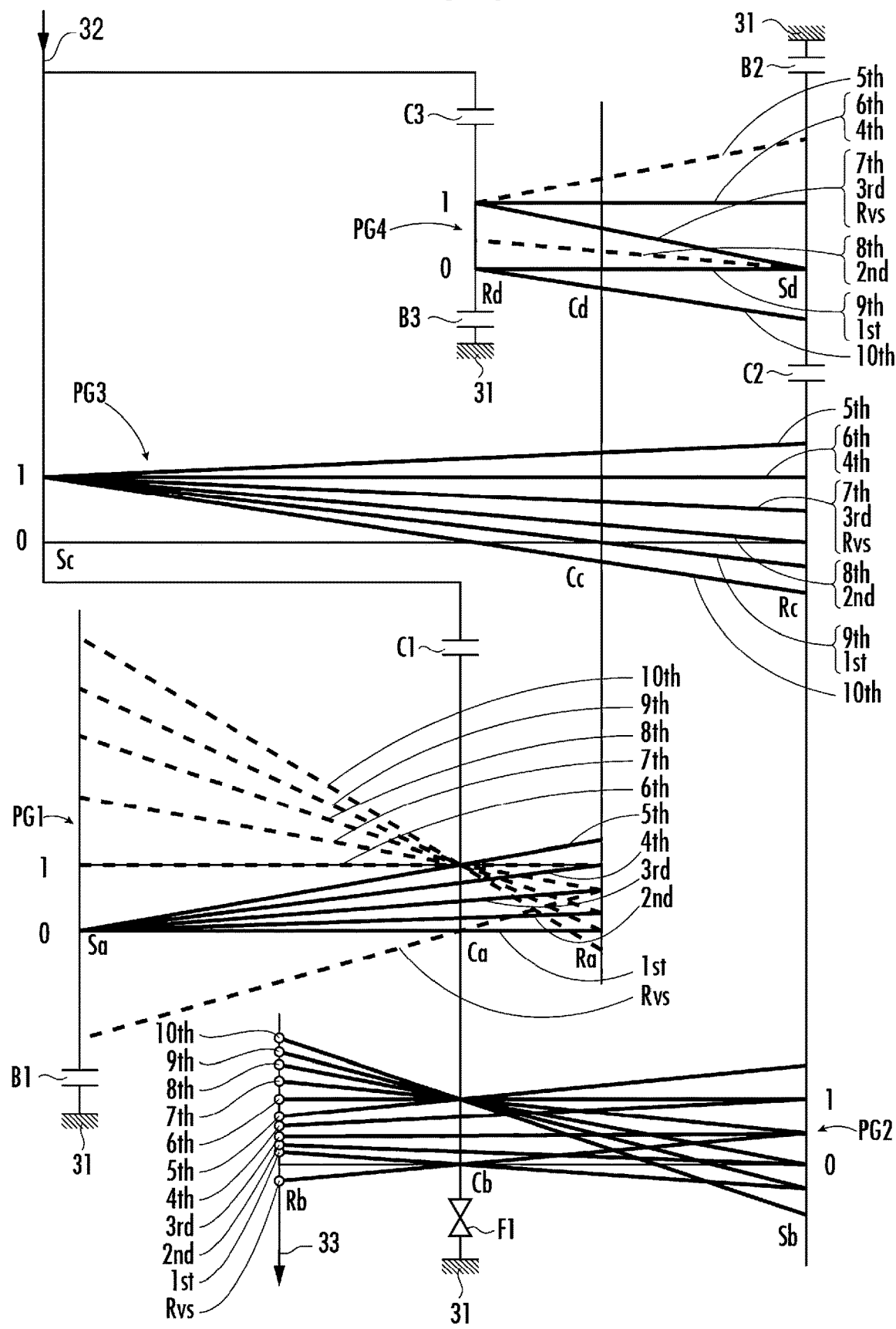
FIG. 3 shows collinear diagrams of planetary gear mechanisms of the transmission shown in FIG. 2.

The second part of FIG. 3 from above shows the collinear diagram of the third planetary gear mechanism PG3. Note that the term "collinear diagram" refers to a diagram that can represent the ratio of the relative rotation speed of three elements, which are a sun gear, a carrier, and a ring gear, by using a straight line (velocity line). In the collinear diagram, the three elements of the third planetary gear mechanism PG3, which are the sun gear Sc, the carrier Cc, and the ring gear Rc, are arranged in order of a first element, a second element, and a third element from the left side with distances corresponding to the gear ratio (the number of teeth of the ring gear/the number of teeth of the sun gear). Then, the first element is the sun gear Sc, the second element is the carrier Cc, and the third element is the ring gear Rc.

Here, the ratio of the distance from the sun gear Sc to the carrier Cc to the distance from the carrier Cc to the ring gear Rc is h:1, where h is the gear ratio of the third planetary gear mechanism PG3. In the collinear diagram, a lower horizontal line and an upper horizontal line (a line that overlap 4th and 6th) respectively represent that the rotation speed is "0" and "1" (the same rotation speed as the input shaft 32).

The fourth planetary gear mechanism PG4 is also a single-pinion planetary gear mechanism including a sun gear Sd, a ring gear Rd, and a carrier Cd that rotatably and revolvably supports a pinion Pd that meshes with the sun gear Sd and the ring gear Rd.

The first part of FIG. 3 from above (the uppermost part of FIG. 3) shows the collinear diagram of the fourth planetary gear mechanism PG4. In the collinear diagram, the three elements of the fourth planetary gear mechanism PG4, which are the sun gear Sd, the carrier Cd, and the ring gear Rd, are arranged in order of a fourth element, a fifth element, and a sixth element from the left side with distances corresponding to the gear ratio. Then, the fourth element is the ring gear Rd, the fifth element is the carrier Cd, and the sixth element is the sun gear Sd.

Here, the ratio of the distance from the sun gear Sd to the carrier Cd to the distance from the carrier Cd to the ring gear Rd is i:1, where i is the gear ratio of the fourth planetary gear mechanism PG4.

The first planetary gear mechanism PG1 is also a single-pinion planetary gear mechanism including a sun gear Sa, a ring gear Ra, and a carrier Ca that rotatably and revolvably supports a pinion Pa that meshes with the sun gear Sa and the ring gear Ra.

The third part of FIG. 3 from above shows the collinear diagram of the first planetary gear mechanism PG1. In the collinear diagram, the three elements of the first planetary gear mechanism PG1, which are the sun gear Sa, the carrier Ca, and the ring gear Ra, are arranged in order of a seventh element, an eighth element, and a ninth element from the left side with distances corresponding to the gear ratio. Then, the seventh element is the sun gear Sa, the eighth element is the carrier Ca, and the ninth element is the ring gear Ra.

Here, the ratio of the distance from the sun gear Sa to the carrier Ca to the distance from the carrier Ca to the ring gear Ra is j:1, where j is the gear ratio of the first planetary gear mechanism PG1.

The second planetary gear mechanism PG2 is also a single-pinion planetary gear mechanism including a sun gear Sb, a ring gear Rb, and a carrier Cb that rotatably and revolvably supports a pinion Pb that meshes with the sun gear Sb and the ring gear Rb.

The fourth part of FIG. 3 from above (the lowermost part of FIG. 3) shows the collinear diagram of the second planetary gear mechanism PG2. In the collinear diagram, the three elements of the second planetary gear mechanism PG2, which are the sun gear Sb, the carrier Cb, and the ring gear Rb, are arranged in order of a tenth element, an eleventh element, and a twelfth element from the left side with distances corresponding to the gear ratio. Then, the tenth element is the ring gear Rb, the eleventh element is the carrier Cb, and the twelfth element is the sun gear Sb.

Here, the ratio of the distance from the sun gear Sb to the carrier Cb to the distance from the carrier Cb to the ring gear Rb is k:1, where k is the gear ratio of the second planetary gear mechanism PG2.

The sun gear Sc (first element) of the third planetary gear mechanism PG3 is coupled to the input shaft 32. The ring gear Rb (tenth element) of the second planetary gear mechanism PG2 is coupled to the output member 33, which includes an output gear.

The carrier Cc (second element) of the third planetary gear mechanism PG3, the carrier Cd (fifth element) of the fourth planetary gear mechanism PG4, and the ring gear Ra (ninth element) of the first planetary gear mechanism PG1 are coupled to form a first coupled body Cc-Cd-Ra.

The ring gear Rc (third element) of the third planetary gear mechanism PG3 and the sun gear Sb (twelfth element) of the second planetary gear mechanism PG2 are coupled to form a second coupled body Rc-Sb.

The carrier Ca (eighth element) of the first planetary gear mechanism PG1 and the carrier Cb (eleventh element) of the second planetary gear mechanism PG2 are coupled to form a third coupled body Ca-Cb.

The transmission 3 includes seven engagement mechanisms that include three clutches, which are a first clutch C1, a second clutch C2, and a third clutch C3; three brakes, which are a first brake B1, a second brake B2, and a third brake B3; and one two-way clutch F1.

The first clutch C1 a hydraulic wet multi-disc clutch. The first clutch C1 is switchable between a coupling state in which the first clutch C1 couples the sun gear Sc (first element) of the third planetary gear mechanism PG3 to the third coupled body Ca-Cb and a release state in which the first clutch C1 does not couple the sun gear Sc to the third coupled body Ca-Cb.

The third clutch C3 is a hydraulic wet multi-disc clutch. The third clutch C3 is switchable between a coupling state in which the third clutch C3 couples the sun gear Sc (first element) of the third planetary gear mechanism PG3 to the ring gear Rd (fourth element) of the fourth planetary gear mechanism PG4 and a release state in which the third clutch C3 does not couple the sun gear Sc to the ring gear Rd.

The second clutch C2 is a hydraulic wet multi-disc clutch. The second clutch C2 is switchable between a coupling state in which the second clutch C2 couples the sun gear Sd (sixth element) of the fourth planetary gear mechanism PG4 to the second coupled body Rc-Sb and a release state in which the second clutch C2 does not couple the sun gear Sd to the second coupled body Rc-Sb.

The two-way clutch F1 also functions as a fourth brake B4. The two-way clutch F1 is switchable between a reverse-rotation inhibiting state in which the two-way clutch F1 allows forward rotation (rotation in the same rotation direction as the input shaft 32 and the output member 33) of the third coupled body Ca-Cb and inhibits reverse rotation of the third coupled body Ca-Cb, and a fixing state in which the two-way clutch F1 fixes the third coupled body Ca-Cb to the transmission case 31.

When the two-way clutch F1 in the reverse-rotation inhibiting state and a force for rotating the third coupled body Ca-Cb in the forward direction is applied to the third coupled body Ca-Cb, this rotation is allowed and the two-way clutch F1 enters a release state. On the other hand, when a force for rotating the third coupled body Ca-Cb in the reverse direction is applied to the third coupled body Ca-Cb, this rotation is inhibited and the two-way clutch F1 enters the fixing state fixed to the transmission case 31.

The first brake B1 is a hydraulic wet multi-disc brake. The first brake B1 is switchable between a fixing state in which the first brake B1 fixes the sun gear Sa (seventh element) of the first planetary gear mechanism PG1 to the transmission case 31, and a release state in which the first brake B1 does not fix the sun gear Sa to the transmission case 31.

The second brake B2 is a hydraulic wet multi-disc brake. The second brake B2 is switchable between a fixing state in which the second brake B2 fixes the sun gear Sd (sixth element) of the fourth planetary gear mechanism PG4 to the transmission case 31, and a release state in which the second brake B2 does not fix the sun gear Sd to the transmission case 31.

The third brake B3 is a hydraulic wet multi-disc brake. The third brake B3 is switchable between a fixing state in which the third brake B3 fixes the ring gear Rd (fourth element) of the fourth planetary gear mechanism PG4 to the transmission case 31, and a release state in which the third brake B3 does not fix the ring gear Rd to the transmission case 31.

Switching of the three clutches, which are the first clutch C1, the second clutch C2, and the third clutch C3; switching of the three brakes, which are the first brake B1, the second brake B2, and the third brake B3; and switching of the one two-way clutch F1 are controlled by a gear-change control device ECU (see FIG. 1), including a transmission controller unit (TCU), on the basis of vehicle information, such as the driving speed of the vehicle V, sent from an integrated control unit (not shown).

The gear-change control device ECU is an electronic unit (not shown) including a CPU, a memory, and the like. The gear-change control device ECU controls the transmission 3 by receiving predetermined vehicle information, such as the driving speed and the throttle opening degree of the vehicle V, the rotation speed and the output torque of the engine E, the operation information of a paddle shift lever, and the like; and by executing a control program stored in a storage device, such as a memory.

In the transmission 3, in order from a side on which the engine E and the torque converter 2 are disposed, the first clutch C1, the first planetary gear mechanism PG1, the second planetary gear mechanism PG2, the third planetary gear mechanism PG3, the second clutch C2, the fourth planetary gear mechanism PG4, and the third clutch C3 are arranged on the axis of the input shaft 32.

The third brake B3 is disposed outside in the radial direction of the fourth planetary gear mechanism PG4, the second brake B2 is disposed outside in the radial direction of the second clutch C2, the first brake B1 is disposed outside in the radial direction of the first clutch C1, and the two-way clutch F1 is disposed outside in the radial direction of the first planetary gear mechanism PG1.

Thus, in the transmission 3, the first brake B1, the second brake B2, the third brake B3, and the two-way clutch F1 are disposed outside in the radial directions of the planetary gear mechanisms or the clutches. With this structure, the axial length of the transmission 3 can be reduced compared with a case where the first brake B1, the second brake B2, the third brake B3, and the two-way clutch F1 are arranged on the axis of the input shaft 32 together with the planetary gear mechanisms.

The axial length of the transmission 3 can be reduced also by disposing the third brake B3 outside in the radial direction of the third clutch C3 and disposing the second brake B2 outside in the radial direction of the fourth planetary gear mechanism PG4.

Referring to FIGS. 3 and 4, how the transmission 3 according to the embodiment is shifted to respective gears will be described.

In FIG. 3, velocity lines shown by broken lines represent that, in synchronism with some of the first planetary gear mechanism PG1, the second planetary gear mechanism PG2, the third planetary gear mechanism PG3, and the fourth planetary gear mechanism PG4 that transmit power, elements of the other planetary gear mechanisms rotate (idle).

FIG. 4 is a table showing the states of three clutches, which are the first clutch C1, the second clutch C2, and the third clutch C3; the three brakes, which are the first brake B1, the second brake B2, and the third brake B3; and the one two-way clutch F1, for respective gears described below.

In FIG. 4, a circle in each of the columns for the first clutch C1, the second clutch C2, the third clutch C3, the first brake B1, the second brake B2, and the third brake B3 represents a coupling state or a fixing state; and a blank in each of the columns represents a release state. In the column for the two-way clutch F1, "R" represents a reverse-rotation inhibiting state and "L" represents a fixing state.

Underlined "R" and underlined "L" represent that the rotation speed of the third coupled body Ca-Cb is "0" due to the function of the two-way clutch F1. "R/L" represents that the two-way clutch F1 is normally in the reverse-rotation inhibiting state "R" and is switched to the fixing state "L" when using an engine brake.

FIG. 4 shows the transmission gear ratio (the rotation speed of the input shaft 32/the rotation speed of the output member 33) and the geometric ratio (the ratio between the transmission gear ratios for respective gears, which is calculated by diving the transmission gear ratio of predetermined gear by the transmission gear ratio of gear that is one step higher than the predetermined gear) for each gear when the gear ratio h of the third planetary gear mechanism PG3 is 2.734, the gear ratio i of the fourth planetary gear mechanism PG4 is 1.614, the gear ratio j of the first planetary gear mechanism PG1 is 2.681, and the gear ratio k of the second planetary gear mechanism PG2 is 1.914. As can be seen from FIG. 4, the geometric ratios can be appropriately set.

When shifting to first gear, the two-way clutch F1 is set to the reverse-rotation inhibiting state ("R" in FIG. 4), and the first brake B1 and the second brake B2 are each set to the fixing state.

By setting the two-way clutch F1 to the reverse-rotation inhibiting state (R) and setting the first brake B1 to the fixing state, reverse rotation of the third coupled body Ca-Cb and the sun gear Sa (seventh element) of the first planetary gear mechanism PG1 is inhibited, and the rotation speeds of the third coupled body Ca-Cb and the sun gear Sa (seventh element) of the first planetary gear mechanism PG1 become "0".

Thus, the sun gear Sa (seventh element), the carrier Ca (eighth element), and the ring gear Ra (ninth element) of the first planetary gear mechanism PG1 enter a locked state in which these gears are relatively unrotatable; and the rotation speed of the first coupled body Cc-Cd-Ra, including the ring gear Ra (ninth element) of the first planetary gear mechanism PG1, also becomes "0".

Then, the rotation speed of the ring gear Rb (tenth element) of the second planetary gear mechanism PG2, to which the output member 33 is coupled, becomes "1st" shown in FIG. 3, thereby shifting to first gear.

In order to shift to first gear, it is not necessary to set the second brake B2 to the fixing state. However, the second brake B2 is set to the fixing state in order that shifting from first gear to second gear (described below) can be smoothly performed. An engine brake can be used in first gear by switching the two-way clutch F1 from the reverse-rotation inhibiting state (R) to the fixing state (L).

When shifting to second gear, the two-way clutch F1 is set to the reverse-rotation inhibiting state ("R"), the first brake B1 and the second brake B2 are each set to the fixing state, and the second clutch C2 is set to the coupling state.

By setting the two-way clutch F1 to the reverse-rotation inhibiting state, forward rotation of the third coupled body Ca-Cb is allowed. By setting the first brake B1 to the fixing state, the rotation speed of the sun gear Sa (seventh element) of the first planetary gear mechanism PG1 becomes "0". By setting the second brake B2 to the fixing state, the rotation speed of the sun gear Sd (sixth element) of the fourth planetary gear mechanism PG4 becomes "0".

By setting the second clutch C2 to the coupling state, the rotation speed of the second coupled body Rc-Sb becomes "0", which is the same as the rotation speed of the sun gear Sd (sixth element) of the fourth planetary gear mechanism PG4.

Then, the rotation speed of the ring gear Rb (tenth element) of the second planetary gear mechanism PG2, to which the output member 33 is coupled, becomes "2nd" shown in FIG. 3, thereby shifting to second gear.

When shifting to third gear, the two-way clutch F1 is set to the reverse-rotation inhibiting state, the first brake B1 and the second brake B2 are each set to the fixing state, and the third clutch C3 is set to the coupling state.

By setting the two-way clutch F1 to the reverse-rotation inhibiting state, forward rotation of the third coupled body Ca-Cb is allowed. By setting the first brake B1 to the fixing state, the rotation speed of the sun gear Sa (seventh element) of the first planetary gear mechanism PG1 becomes "0". By setting the second brake B2 to the fixing state, the rotation speed of the sun gear Sd (sixth element) of the fourth planetary gear mechanism PG4 becomes "0".

By setting the third clutch C3 to the coupling state, the rotation speed of the ring gear Rd (fourth element) of the fourth planetary gear mechanism PG4 becomes "1", which is the same as the rotation speed of the sun gear Sc (first element) of the third planetary gear mechanism PG3, which is coupled to the input shaft 32.

Thus, the rotation speed of the sun gear Sd (sixth element) of the fourth planetary gear mechanism PG4 becomes "0", and the rotation speed of the ring gear Rd (fourth element) becomes "1". Therefore, the rotation speed of the carrier Cd (fifth element), that is, the rotation speed of the first coupled body Cc-Cd-Ra becomes $i/(i+1)$.

Then, the rotation speed of the ring gear Rb (tenth element) of the second planetary gear mechanism PG2, to which the output member 33 is coupled, becomes "3rd" shown in FIG. 3, thereby shifting to third gear.

When shifting to fourth gear, the two-way clutch F1 is set to the reverse-rotation inhibiting state, the first brake B1 is set to the fixing state, and the second clutch C2 and the third clutch C3 are each set to the coupling state.

By setting the two-way clutch F1 to the reverse-rotation inhibiting state, forward rotation of the third coupled body Ca-Cb is allowed. By setting the first brake B1 to the fixing state, the rotation speed of the sun gear Sa (seventh element) of the first planetary gear mechanism PG1 becomes "0".

By setting the second clutch C2 to the coupling state, the sun gear Sd (sixth element) of the fourth planetary gear mechanism PG4 and the second coupled body Rc-Sb rotate at the same speed. Thus, between the third planetary gear mechanism PG3 and the fourth planetary gear mechanism PG4, the carrier Cc (second element) and the carrier Cd (fifth element) are coupled to each other, and the ring gear Rc (third element) and the sun gear Sd (sixth element) are coupled to each other. Therefore, in fourth gear, in which the second clutch C2 is in the coupling state, one collinear diagram including four elements of the third planetary gear mechanism PG3 and the fourth planetary gear mechanism PG4 can be drawn.

By setting the third clutch C3 to the coupling state, the rotation speed of the ring gear Rd (fourth element) of the fourth planetary gear mechanism PG4 becomes "1", which is the same as the rotation speed of the sun gear Sc (first element) of the third planetary gear mechanism PG3. Thus, the rotation speeds of two of the four elements of the third planetary gear mechanism PG3 and the fourth planetary gear mechanism PG4 become the same rotation speed "1".

Thus, the elements of the third planetary gear mechanism PG3 and the fourth planetary gear mechanism PG4 enter a locked state in which these elements are relatively unrotatable; and the rotation speeds of all elements of the third planetary gear mechanism PG3 and the fourth planetary gear mechanism PG4 become "1". The rotation speed of the third coupled body Ca-Cb becomes j/(j+1).

Then, the rotation speed of the ring gear Rb (tenth element) of the second planetary gear mechanism PG2, to which the output member 33 is coupled, becomes "4th" shown in FIG. 3, thereby shifting to fourth gear.

When shifting to fifth gear, the two-way clutch F1 is set to the reverse-rotation inhibiting state, the first brake B1 is set to the fixing state, and the first clutch C1 and the third clutch C3 are each set to the coupling state.

By setting the two-way clutch F1 to the reverse-rotation inhibiting state, forward rotation of the third coupled body Ca-Cb is allowed. By setting the first brake B1 to the fixing state, the rotation speed of the sun gear Sa (seventh element) of the first planetary gear mechanism PG1 becomes "0".

By setting the first clutch C1 to the coupling state, the rotation speed of the third coupled body Ca-Cb becomes "1", which is the same as the rotation speed of the sun gear Sc (first element) of the third planetary gear mechanism PG3.

Then, the rotation speed of the ring gear Rb (tenth element) of the second planetary gear mechanism PG2, to which the output member 33 is coupled, becomes "5th" shown in FIG. 3, thereby shifting to fifth gear.

In order to shift to fifth gear, it is not necessary to set the third clutch C3 to the coupling state. However, because it is necessary to set the third clutch C3 to the coupling state in fourth gear and sixth gear (described below), the third clutch C3 is set to the coupling state also in fifth gear so that downshift from fifth gear to fourth gear and upshift from fifth gear to sixth gear (described below) can be smoothly performed.

When shifting to sixth gear, the two-way clutch F1 is set to the reverse-rotation inhibiting state; and the first clutch C1, the second clutch C2, and the third clutch C3 are each set to the coupling state.

By setting the two-way clutch F1 to the reverse-rotation inhibiting state, forward rotation of the third coupled body Ca-Cb is allowed.

By setting each of the second clutch C2 and the third clutch C3 to the coupling state, as described above regarding fourth gear, the elements of the third planetary gear mechanism PG3 and the fourth planetary gear mechanism PG4 enter a relatively unrotatable state; and the rotation speed of the second coupled body Rc-Sb becomes "1". By setting the first clutch C1 to the coupling state, the rotation speed of the third coupled body Ca-Cb becomes "1".

Thus, in the second planetary gear mechanism PG2, the rotation speed of the carrier Cb (eleventh element) and the rotation speed of the sun gear Sb (twelfth element) become the same "1"; and the second planetary gear mechanism PG2 enters a locked state in which the elements are relatively unrotatable.

Then, the rotation speed of the ring gear Rb (tenth element) of the second planetary gear mechanism PG2, to which the output member 33 is coupled, becomes "6th" shown in FIG. 3, thereby shifting to sixth gear.

When shifting to seventh gear, the two-way clutch F1 is set to the reverse-rotation inhibiting state, the second brake B2 is set to the fixing state, and the first clutch C1 and the third clutch C3 are each set to the coupling state.

By setting the two-way clutch F1 to the reverse-rotation inhibiting state, forward rotation of the third coupled body Ca-Cb is allowed. By setting the second brake B2 to the fixing state, the rotation speed of the sun gear Sd (sixth element) of the fourth planetary gear mechanism PG4 becomes "0".

By setting the third clutch C3 to the coupling state, the rotation speed of the ring gear Rd (fourth element) of the fourth planetary gear mechanism PG4 becomes "1", which is the same as the rotation speed of the sun gear Sc (first element) of the third planetary gear mechanism PG3; and the rotation speed of the first coupled body Cc-Cd-Ra, including the carrier Cd (fifth element) of the fourth planetary gear mechanism PG4, becomes i/(i+1). By setting the first clutch C1 to the coupling state, the rotation speed of the third coupled body Ca-Cb becomes "1", which is the same as the rotation speed of the sun gear Sc (first element) of the third planetary gear mechanism PG3, which is coupled to the input shaft 32.

Then, the rotation speed of the ring gear Rb (tenth element) of the second planetary gear mechanism PG2, to which the output member 33 is coupled, becomes "7th" shown in FIG. 3, thereby shifting to seventh gear.

When shifting to eighth gear, the two-way clutch F1 is set to the reverse-rotation inhibiting state, the second brake B2 is set to the fixing state, and the first clutch C1 and the second clutch C2 are each set to the coupling state.

By setting the two-way clutch F1 to the reverse-rotation inhibiting state, forward rotation of the third coupled body Ca-Cb is allowed. By setting the second brake B2 to the fixing state, the rotation speed of the sun gear Sd (sixth element) of the fourth planetary gear mechanism PG4 becomes "0".

By setting the second clutch C2 to the coupling state, the rotation speed of the second coupled body Rc-Sb becomes "0", which is the same as the rotation speed of the sun gear Sd (sixth element) of the fourth planetary gear mechanism PG4. By setting the first clutch C1 to the coupling state, the rotation speed of the third coupled body Ca-Cb becomes "1", which is the same as the rotation speed of the sun gear Sc (first element) of the third planetary gear mechanism PG3.

Then, the rotation speed of the ring gear Rb (tenth element) of the second planetary gear mechanism PG2, to which the output member 33 is coupled, becomes "8th" shown in FIG. 3, thereby shifting to eighth gear.

When shifting to ninth gear, the two-way clutch F1 is set to the reverse-rotation inhibiting state, the second brake B2 and the third brake B3 are each set to the fixing state, and the first clutch C1 is set to the coupling state.

By setting the two-way clutch F1 to the reverse-rotation inhibiting state, forward rotation of the third coupled body Ca-Cb is allowed. By setting the second brake B2 to the fixing state, the rotation speed of the sun gear Sd (sixth element) of the fourth planetary gear mechanism PG4 becomes "0". By setting the third brake B3 to the fixing state, the rotation speed of the ring gear Rd (fourth element) of the fourth planetary gear mechanism PG4 also becomes "0".

Thus, the carrier Cd (fifth element), the ring gear Rd (fourth element), and the sun gear Sd (sixth element) of the fourth planetary gear mechanism PG4 enter a locked state in which these gears are relatively unrotatable; and the rotation speed of the first coupled body Cc-Cd-Ra, including the carrier Cd (fifth element) of the fourth planetary gear mechanism PG4, also becomes "0".

By setting the first clutch C1 to the coupling state, the rotation speed of the third coupled body Ca-Cb becomes "1", which is the same as the rotation speed of the sun gear Sc (first element) of the third planetary gear mechanism PG3.

Then, the rotation speed of the ring gear Rb (tenth element) of the second planetary gear mechanism PG2, to which the output member 33 is coupled, becomes "9th" shown in FIG. 3, thereby shifting to ninth gear.

When shifting to tenth gear, the two-way clutch F1 is set to the reverse-rotation inhibiting state, the third brake B3 is set to the fixing state, and the first clutch C1 and the second clutch C2 are each set to the coupling state.

By setting the two-way clutch F1 to the reverse-rotation inhibiting state, forward rotation of the third coupled body Ca-Cb is allowed. By setting the third brake B3 to the fixing state, the rotation speed of the ring gear Rd (fourth element) of the fourth planetary gear mechanism PG4 becomes "0".

By setting the second clutch C2 to the coupling state, the second coupled body Rc-Sb and the sun gear Sd (sixth element) of the fourth planetary gear mechanism PG4 rotate at the same speed. By setting the first clutch C1 to the coupling state, the rotation speed of the third coupled body Ca-Cb becomes "1", which is the same as the rotation speed of the sun gear Sc (first element) of the third planetary gear mechanism PG3.

Then, the rotation speed of the ring gear Rd (tenth element) of the second planetary gear mechanism PG2, to which the output member 33 is coupled, becomes "10th" shown in FIG. 3, thereby shifting to tenth gear.

When shifting to reverse gear, the two-way clutch F1 is set to the fixing state ("L" in FIG. 4), the second brake B2 is set to the fixing state, and the third clutch C3 is set to the coupling state.

By setting the second brake B2 to the fixing state and the third clutch C3 to the coupling state, the rotation speed of the first coupled body Cc-Cd-Ra becomes i/(i+1). By setting the two-way clutch F1 to the fixing state, the rotation speed of the third coupled body Ca-Cb becomes "0".

Then, the rotation speed of the ring gear Rb (tenth element) of the second planetary gear mechanism PG2, to which the output member 33 is coupled, becomes "Rvs" (reverse rotation) shown in FIG. 3; thereby shifting to reverse gear.

Figure 5:
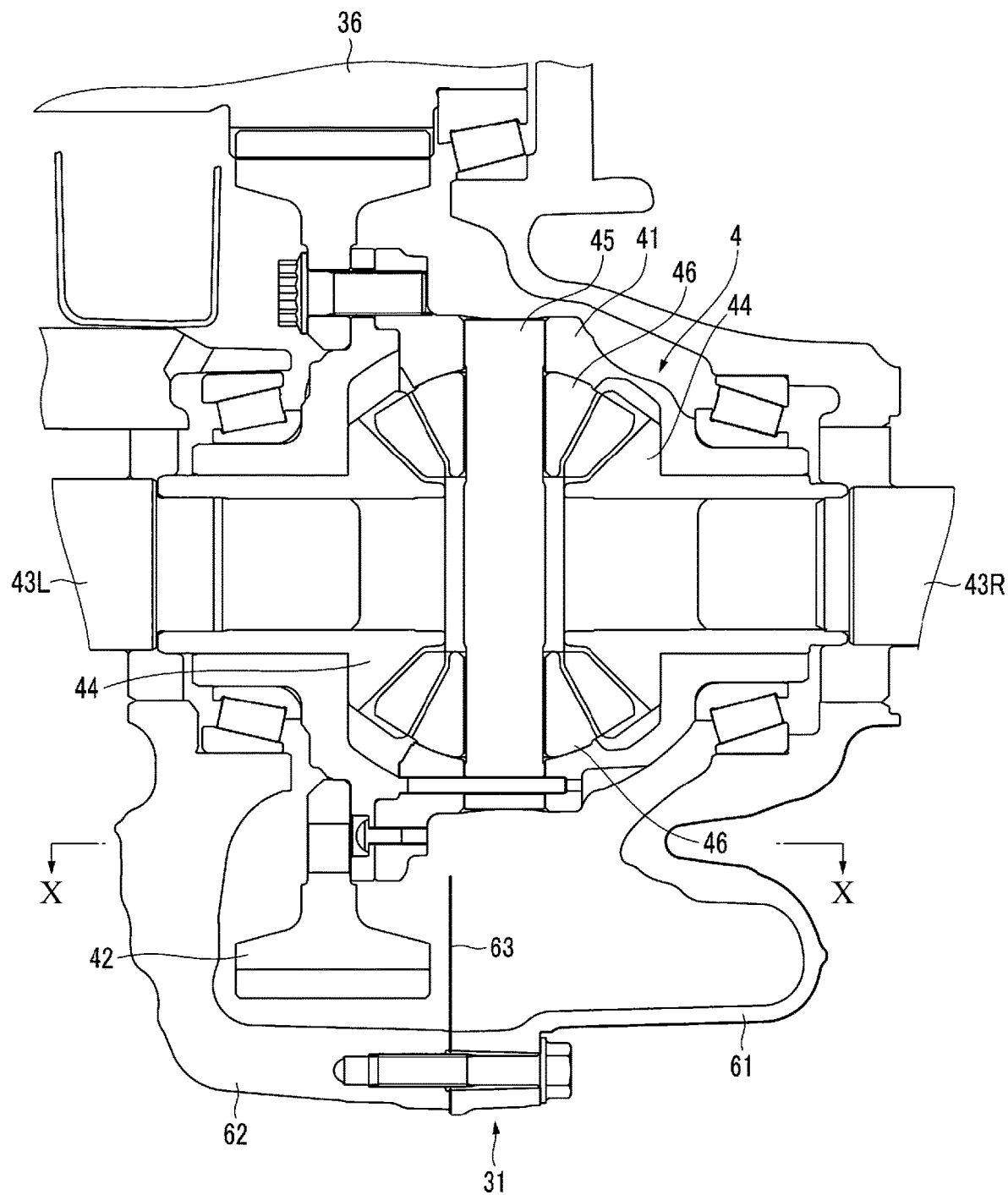
FIG. 5 is a partial sectional front view of a transmission case of the power transmission device shown in FIG. 1.

Referring back to FIG. 2, the front differential gear 4 includes a differential case 41, which is rotatably supported by the transmission case 31 of the transmission 3 (see FIG. 5). The final driven gear 42, which meshes with the final drive gear 36 attached to the idling shaft 35, is fixed to the outer periphery of the differential case 41.

Rotation of the idling shaft 35 of the transmission 3 is transmitted to the differential case 41 via the final drive gear 36 and the final driven gear 42. Rotation of the differential case 41 is transmitted to the left front axle 7L and the right front axle 7R in accordance with the load on the left front wheel WFL and the right front wheel WFR.

A left front output shaft 43L, which is connected to the left front axle 7L, and a right front output shaft 43R, which is connected to the right front axle 7R, are fitted into the differential case 41 so as to be relatively rotatable. A differential side gear 44 is spline-joined to each of opposing ends of the left front output shaft 43L and the right front output shaft 43R.

A pinion shaft 45 is fixed in the differential case 41 so as to extend perpendicular to the left front output shaft 43L and the right front output shaft 43R. A pair of pinion gears 46, which mesh with each of the two differential side gears 44, are rotatably supported by the pinion shaft 45.

The transfer device 5 includes a transfer input shaft 51, to which driving power is transmitted from the final driven gear 42 of the front differential gear 4, and a transfer output shaft 52, to which driving power is transmitted from the transfer input shaft 51 and which transmits the driving power to the propeller shaft 8.

At one end portion of the transfer input shaft 51 on the front differential gear 4 side, a transfer input gear 53, which meshes with the final driven gear 42, is spline-fitted and rotatably supported. At an opposite end portion of the transfer input shaft 51, a first bevel gear 54, which is a helical gear, is disposed.

At an end portion (front end) of the transfer output shaft 52 on the transfer input shaft 51 side, a second bevel gear 55, which is a helical gear, is disposed. To a back end of the transfer output shaft 52, an end of the propeller shaft 8 is joined.

Because the first bevel gear 54 meshes with the second bevel gear 55, rotation of the transfer input shaft 51 is transmitted to the propeller shaft 8 (see FIG. 1) via the transfer output shaft 52.

Next, referring to FIGS. 5 to 12B, the transmission case 31 (housing) and a lubrication structure disposed in the transmission case 31 will be described.

The lubrication structure lubricates the final driven gear 42 (rotating body) by immersing the final driven gear 42 in an oil sump (fluid sump) of lubricating oil (lubricating fluid) collected in the transmission case 31. Moreover, the lubrication structure lubricates other mechanisms contained in the transmission case 31 by splashing the lubricating oil from the oil sump by using rotation of the final driven gear 42.

First, referring to FIGS. 5 to 10, the configuration of the lubrication structure will be described.

As illustrated in FIG. 5, the transmission case 31 includes a TC-side case member 61 and a TM-side case member 62, which are joined to each other along the opening edges thereof. A gasket 63 is held between the opening edge of the TC-side case member 61 and the opening edge of the TM-side case member 62 in order to prevent leakage of lubricating oil from the inside.

Figure 6:
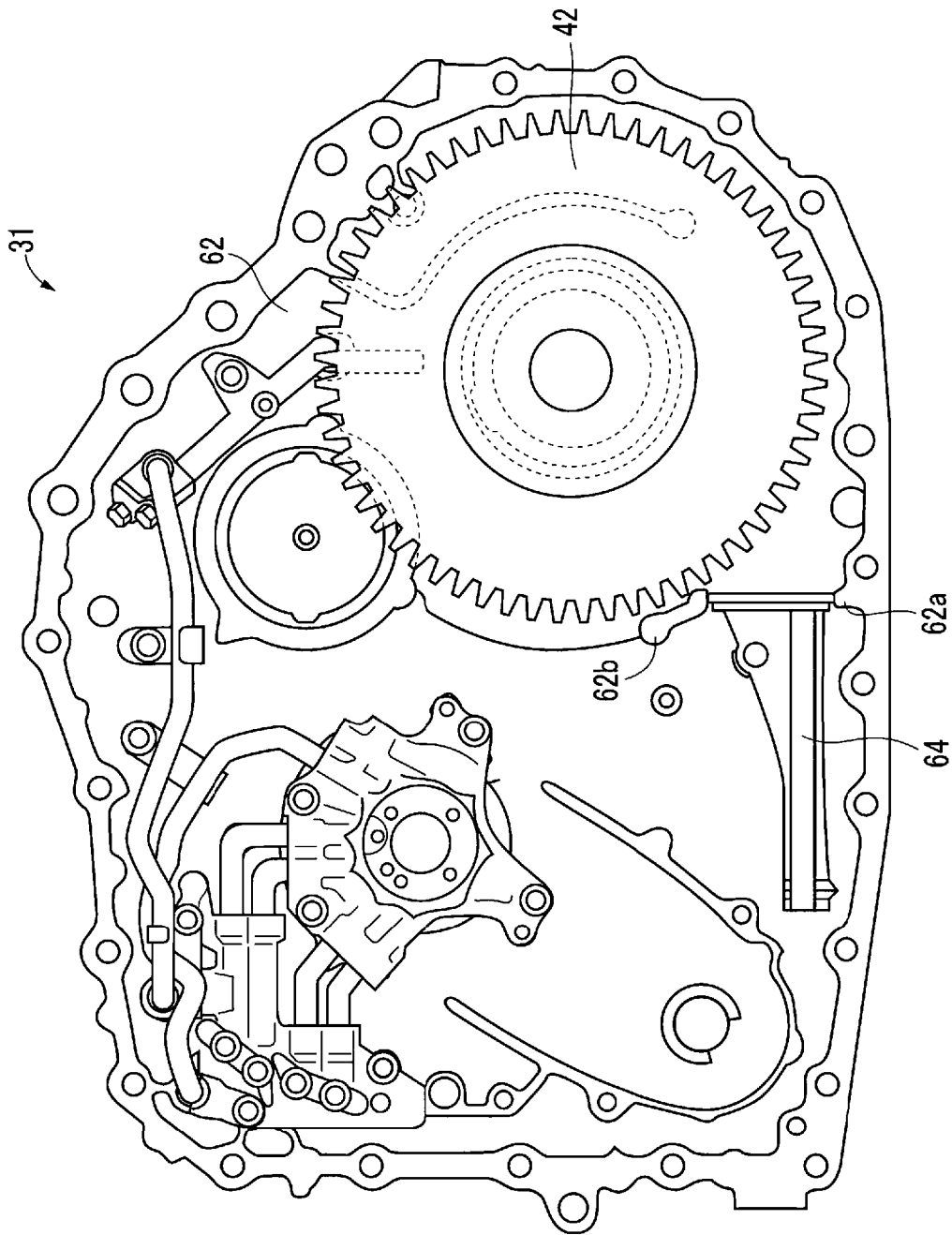
FIG. 6 is a side view showing the position of a duct relative to a TM-side case member of the transmission case shown in FIG. 5.

As illustrated in FIG. 6, a duct 64 is disposed at a position that is in a lower part of the space in the transmission case 31, that is on the TM-side case member 62 side, and that is separated from the final driven gear 42 in a direction that crosses the rotation axis of the final driven gear 42 (in other words, at a position in front of the final driven gear 42 in the driving direction of the vehicle V).

Figure 7:
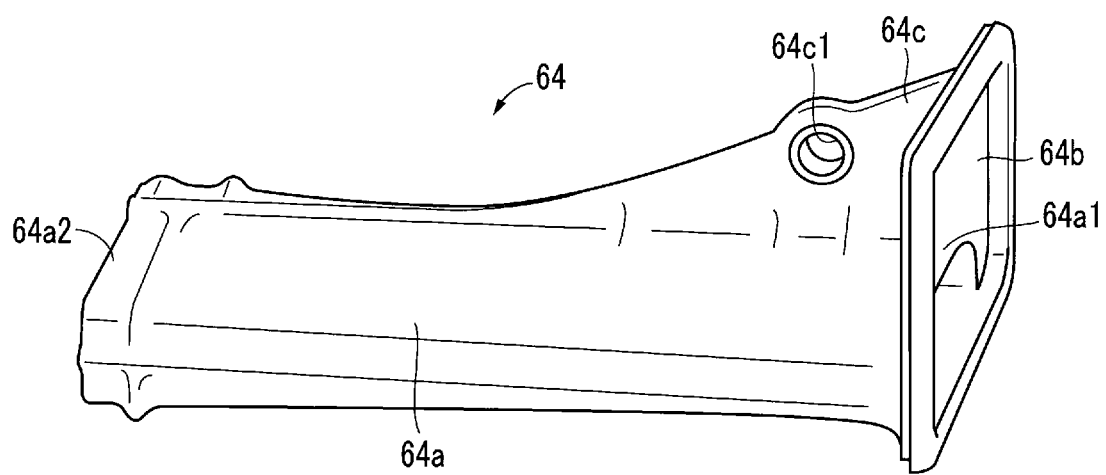
FIG. 7 is a perspective view of the duct shown in FIG. 6.

As illustrated in FIG. 7, the duct 64 includes a tubular body 64a, a wall portion 64b that extends in the radial direction from the edge of one opening (a first opening 64a1) of the body 64a, and a support portion 64c that stands on the peripheral surface of the body 64a and the wall portion 64b and that supports the wall portion 64b. A bolt hole 64c1, for fixing the duct 64 to the TM-side case member 62 by using a bolt, is formed in the support portion 64c.

Referring back to FIG. 6, the duct 64 is disposed in such a way that the axis of the body 64a extends in the driving direction of the vehicle V. The TM-side case member 62 includes a first partition rib 62a, which protrudes toward the duct 64, at a position that is to be located below the wall portion 64b when the duct 64 is attached to the TM-side case member 62. The TM-side case member 62 includes a second partition rib 62b, which protrudes toward the duct 64, at a position that is to be located above the wall portion 64b when the duct 64 is attached to the TM-side case member 62.

Figure 9:
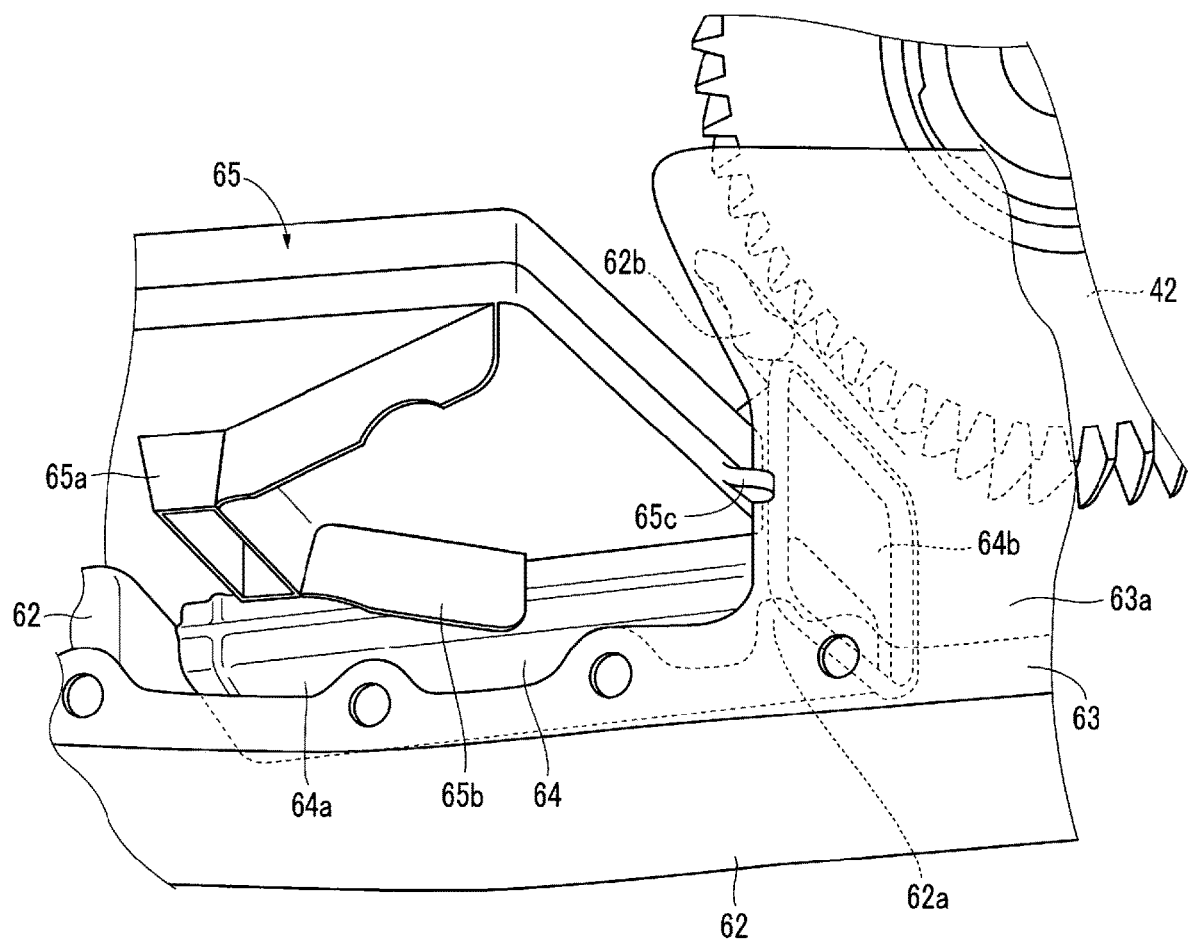
FIG. 9 is a lower perspective view illustrating the positional relationship between the duct and the strainer in the transmission case shown in FIG. 5.
Figure 10:
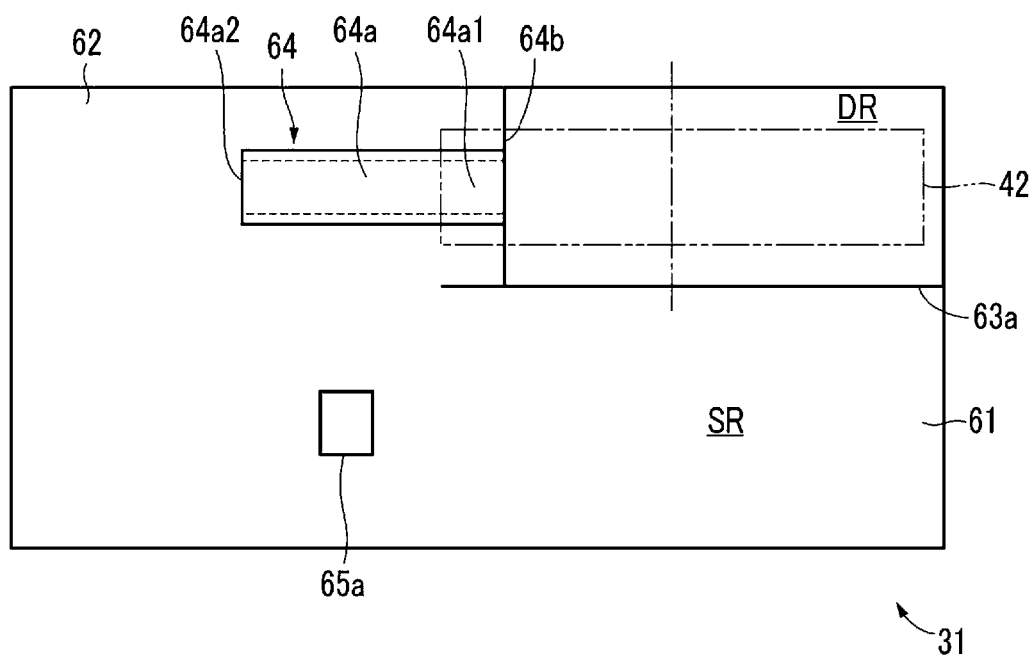
FIG. 10 is a schematic sectional view showing the positions of a differential chamber and a strainer chamber of the transmission case taken along line V-V of FIG. 5.

Thus, when the duct 64 is attached to the TM-side case member 62, the wall portion 64b of the duct 64, the first partition rib 62a, and the second partition rib 62b form a partition wall that is a part of a partition member (see FIGS. 9 and 10).

Figure 8:
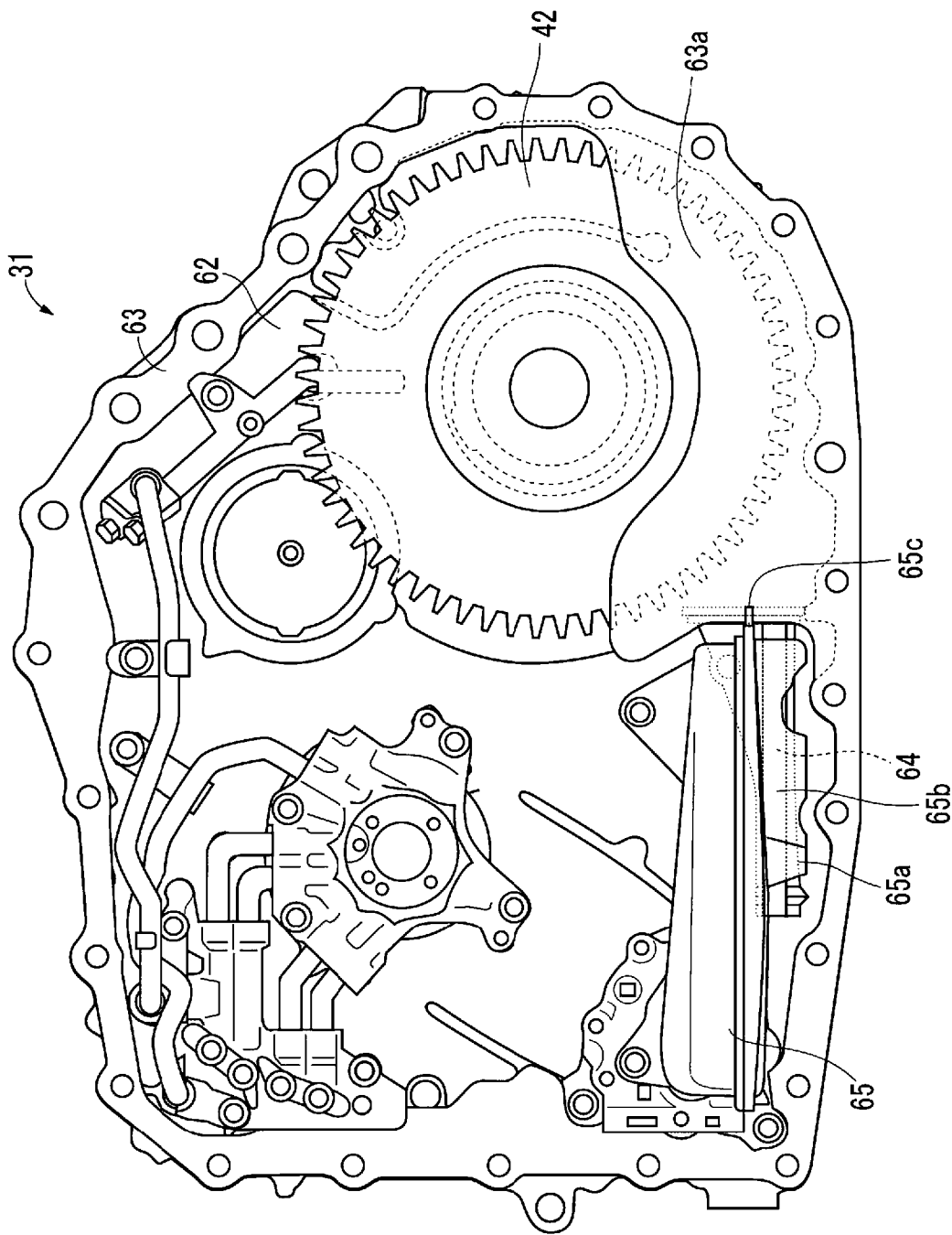
FIG. 8 is a side view showing the positions of a gasket and a strainer relative to the TM-side case member of the transmission case shown in FIG. 5.

As illustrated in FIG. 8, a strainer 65 is disposed at a position that is in a lower part of the space in the transmission case 31, that is closer to the TC-side case member 61 than the duct 64 and the gasket 63 is (in other words, an end surface of the TM-side case member 62) is, and that is lateral to the duct 64.

As illustrated in FIG. 9, the strainer 65 has a suction inlet 65a, through which the strainer 65 suctions lubricating oil from an oil sump, in a central part of a lower surface thereof. A pump (not shown) suctions lubricating oil from the oil sump via the suction inlet 65a of the strainer 65 and supplies the lubricating oil to various mechanisms.

The strainer 65 further includes a first protrusion 65b, which is formed continuously with the suction inlet 65a, and a second protrusion 65c, which is formed on an end surface of the strainer 65 on the final driven gear 42 side.

The first protrusion 65b includes a pair of wall portions that extend toward the final driven gear 42 in a V-shape from both side portions of the suction inlet 65a. When lubricating oil moves forward (see FIG. 12B) during braking of the vehicle V or the like, the lubricating oil is efficiently collected to a region around the suction inlet 65a due to the first protrusion 65b.

When the strainer 65 is attached to the TM-side case member 62, one of the pair of wall portions of the first protrusion 65b on the TM-side case member 62 side directly contacts the body 64a of the duct 64 from the TC-side case member 61 side, and the second protrusion 65c indirectly contacts a side edge of the wall portion 64b of the duct 64 from the TC-side case member 61 side via a protruding portion 63a (described below) of the gasket 63.

The duct 64 is fastened to the TM-side case member 62 by screwing a bolt into the bolt hole 64c1 and is fixed to the TM-side case member 62 as the strainer 65 contacts the duct 64 from the TC-side case member 61 side.

Referring back to FIG. 8, the gasket 63 includes the protruding portion 63a, which is located at a position lateral to the final driven gear 42 and which protrudes toward the inside of the transmission case 31. The protruding portion 63a covers a region below the rotation axis of the final driven gear 42 in a side view (see FIG. 8 and other figures).

A part of the protruding portion 63a close to the rotation axis of the final driven gear 42 (a part above the wall portion 64b of the duct 64) has a shape that widens upward so as to protrude further than the wall portion 64b of the duct 64 toward the body 64a (that is, toward the strainer 65).

The protruding portion 63a is held among the second protrusion 65c of the strainer 65, an edge of the wall portion 64b of the duct 64, and the first partition rib 62a and the second partition rib 62b of the TM-side case member 62 (see FIG. 9).

With the lubrication structure configured as described above, a partition member is formed by combining the protruding portion 63a of the gasket 63, the wall portion 64b of the duct 64, and the first partition rib 62a and the second partition rib 62b of the TM-side case member 62. The partition member defines two spaces in a lower part of the transmission case 31.

To be specific, as illustrated in FIG. 10, in a lower part of the space in the transmission case 31, a differential chamber DR (first chamber) and a strainer chamber SR (second chamber) are defined by the partition member, which includes the protruding portion 63a, the wall portion 64b, and the first partition rib 62a and the second partition rib 62b of the TM-side case member 62. The differential chamber DR contains the final driven gear 42 and is substantially rectangular in plan view. The strainer chamber SR communicates with the differential chamber DR through an upper part of the space in the transmission case 31 (see FIG. 11), contains the strainer 65, and is substantially L-shaped in plan view.

To facilitate understanding, regarding the gasket 63, FIG. 10 illustrates only the protruding portion 63a and does not illustrate the boundary between the TC-side case member 61 and the TM-side case member 62. Regarding the strainer 65, FIG. 10 illustrates only the suction inlet 65a.

The differential chamber DR and the strainer chamber SR communicate with each other through the tubular body 64a of the duct 64. An opening (a second opening 64a2) of the body 64a in the strainer chamber SR is located farther from the differential chamber DR in the front-back direction of the vehicle V (the left-right direction in FIG. 10) than the suction inlet 65a of the strainer 65 is.

Figure 11:
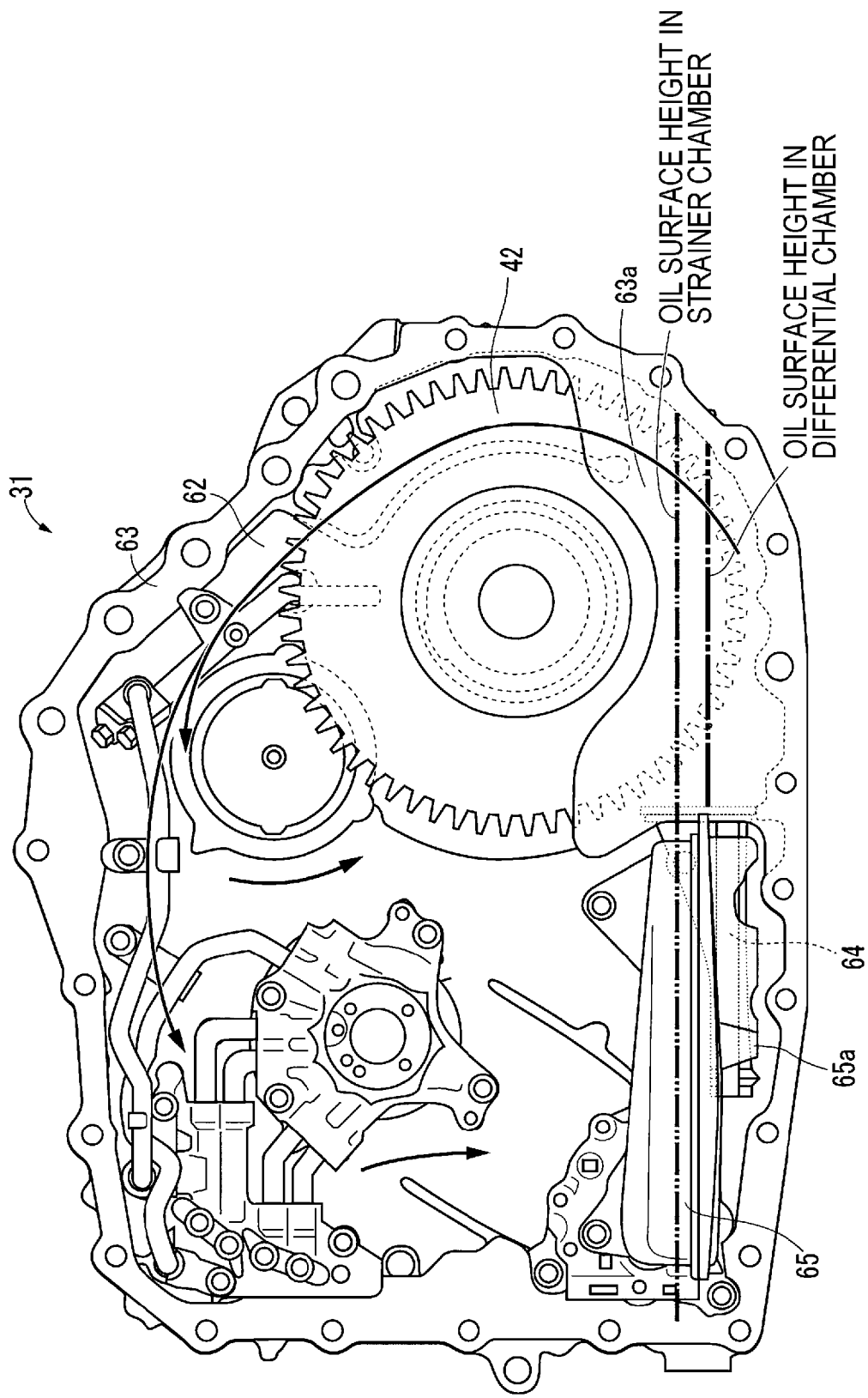
FIG. 11 is a side view illustrating flow of lubricating oil in the transmission case shown in FIG. 5.
Figure 12A:
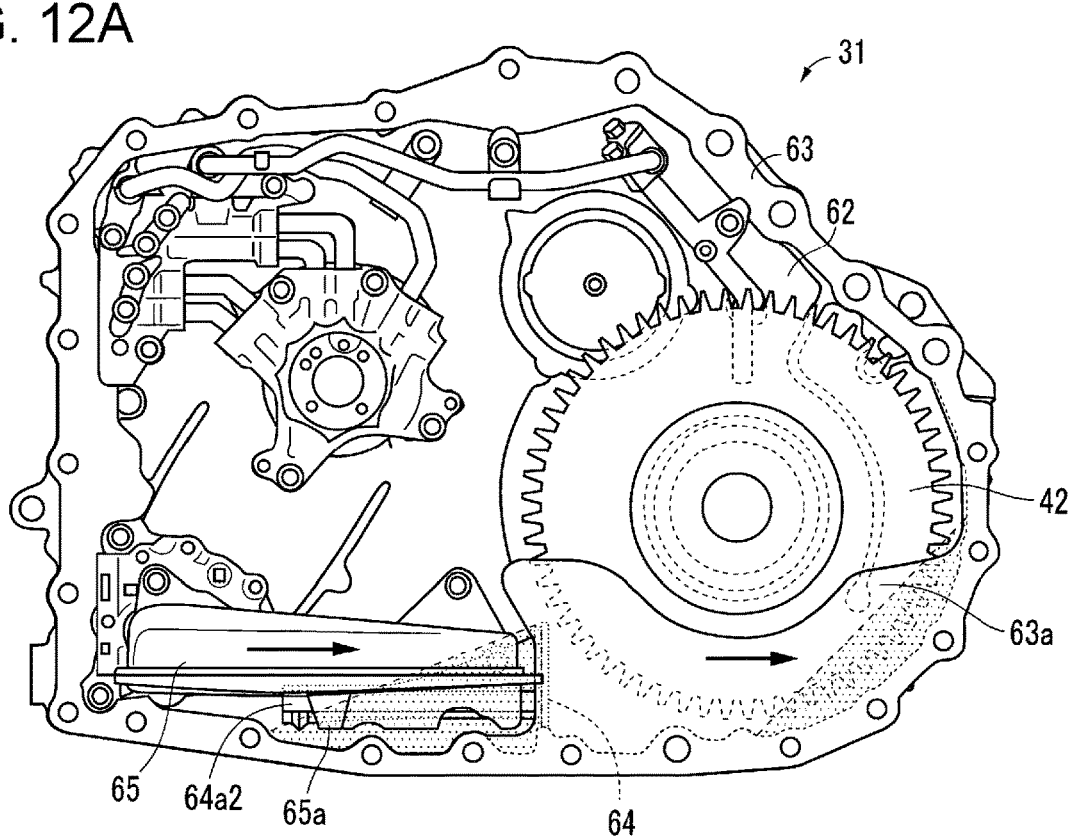
FIG. 12A illustrates oil surfaces of oil sumps in the transmission case shown in FIG. 5 when the vehicle accelerates.
Figure 12B:
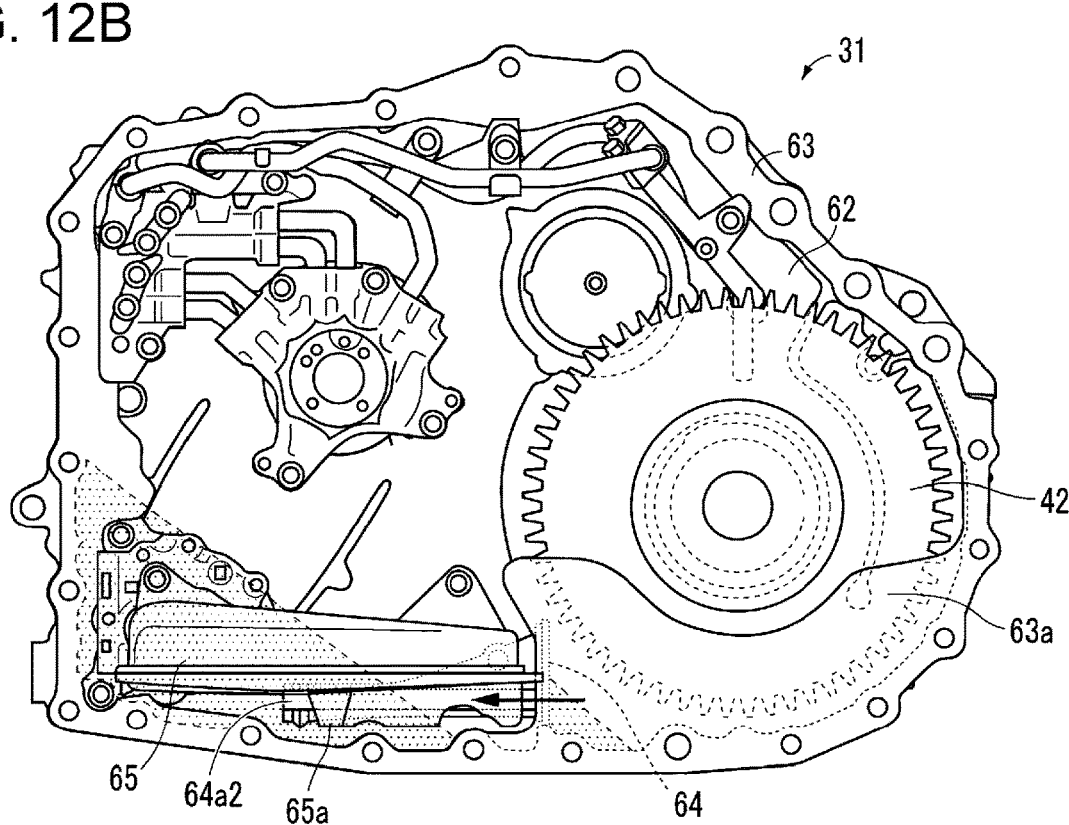
FIG. 12B illustrates the oil surfaces when the vehicle brakes.

Next, referring to FIGS. 11, 12A, and 12B, flow of lubricating oil in the lubrication structure will be described. The arrows in FIGS. 11, 12A, and 12B indicate directions in which the lubricating oil flows. In FIG. 11, the widely-spaced two-dot chain line represents the height of the oil surface of lubricating oil in the oil sump of the differential chamber DR, and the closely-spaced two-dot chain line represents the height of the oil surface of lubricating oil in the oil sump of the strainer chamber SR. In FIGS. 12A and 12B, the hatched regions schematically represent the positions of the oil sumps of the differential chamber and the strainer chamber.

As illustrated in FIG. 11, lubricating oil supplied into the transmission case 31 collects in a lower part of the space in the transmission case 31 and forms oil sumps.

A lower part of the final driven gear 42 is immersed in one of the oil sumps formed in the differential chamber DR. Therefore, the final driven gear 42 is lubricated by the lubricating oil in the oil sump. The lubricating oil in the oil sump is splashed upward and scattered in the transmission case 31 as the final driven gear 42 rotates.

The scattered lubricating oil flows downward while lubricating various mechanisms contained in the transmission case 31. At this time, because the differential chamber DR and the strainer chamber SR communicate with each other through an upper part of the space in the transmission case 31, the lubricating oil flowing downward flows into both of the differential chamber DR and the strainer chamber SR.

Subsequently, further movement of lubricating oil supplied to the strainer chamber SR is restricted by the partition member including the protruding portion 63a of the gasket 63, the wall portion 64b of the duct 64, and the first partition rib 62a and the second partition rib 62b of the TM-side case member 62. As a result, most of lubricating oil that has been splashed by the final driven gear 42 from the oil sump of the differential chamber DR and that has moved downward in the transmission case 31 collects in the strainer chamber SR.

Thus, the height of the oil surface of the oil sump of the differential chamber DR (the height indicated by the widely-spaced two-dot chain line in FIG. 11) becomes lower than that of a case where the partition member is not provided. On the other hand, the height of the oil surface of the oil sump of the strainer chamber SR (the height represented by the closely-spaced two-dot chain line in FIG. 11) becomes higher than that of a case where the partition member is not provided.

Accordingly, with the lubrication structure disposed in the transmission case 31, the height of the oil surface of the oil sump of the differential chamber DR is lowered, and the volume of a portion of the final driven gear 42 immersed in lubricating oil is reduced. Therefore, it is possible to reduce resistance applied to the final driven gear 42 when the final driven gear 42 rotates and splashes lubricating oil from the oil sump.

With the lubrication structure described above, by keeping the height of the oil surface of the oil sump of the strainer chamber SR high in an ordinary situation, it is possible to make the suction inlet 65a of the strainer 65 be less likely to be exposed and to make air less likely to be mixed into lubricating oil that the strainer 65 suctions from the suction inlet 65a.

With the lubrication structure described above, for example, if the vehicle V, in which the power transmission device PT including the lubrication structure is mounted, accelerates sharply, or if a large braking force is applied to the vehicle V (that is, in an extraordinary situation), the oil surface of an oil sump in the transmission case 31 may vary considerably.

However, with the lubrication structure described above, even if such a change of the oil surface occurs, exposure of the suction inlet 65a of the strainer 65 is prevented and air is not likely to be mixed into the lubricating oil that the strainer 65 suctions from the suction inlet 65a.

With the lubrication structure described above, the differential chamber DR and the strainer chamber SR communicate with each other through the duct 64, and the suction inlet 65a of the strainer 65 is located closer to the differential chamber DR than an end portion of the duct 64 (that is, the second opening 64a2 in the strainer chamber SR) is. Moreover, the tubular body 64a of the duct 64 extends in the driving direction of the vehicle V.

Therefore, as illustrated in FIG. 12A, when, for example, a large acceleration force is applied to the vehicle V (when, for example, the vehicle V accelerates sharply) and the lubricating oil in the oil sumps in the transmission case 31 moves backward considerably, the second opening 64a2 of the duct 64 becomes exposed in an early stage. That is, movement of the lubricating oil from the strainer chamber SR to the differential chamber DR via the duct 64 is restricted in an early stage.

As a result, lubricating oil collects in a part of the space in the strainer chamber SR that is behind the end portion of the duct 64 (in other words, a portion in which the suction inlet 65a of the strainer 65 is located). Thus, the depth of the oil sump of the strainer chamber SR is maintained, and exposure of the suction inlet 65a of the strainer 65 is prevented.

On the other hand, as illustrated in FIG. 12B, when, for example, a large braking force is applied to the vehicle V (when, for example, the vehicle V is braked sharply) and the lubricating oil in the oil sump of the transmission case 31 moves forward considerably, the lubricating oil moves smoothly from the differential chamber DR to the strainer chamber SR without being affected by the position of the second opening 64a2 of the duct 64.

As a result, lubricating oil in the oil sump of the differential chamber DR flows into the strainer chamber SR, a deep oil sump is formed from a large amount of lubricating oil, and exposure of the suction inlet 65a of the strainer 65 is prevented.

Accordingly, with the lubrication structure disposed in the transmission case 31, it is possible to make the suction inlet 65a of the strainer 65 less likely to be exposed and to make air to be less likely to be mixed into lubricating oil supplied from the strainer 65 to other mechanisms by keeping the height of the oil surface of the oil sump of the strainer chamber SR high in an ordinarily situation, by restricting movement of the lubricating oil from the strainer chamber SR to the differential chamber DR when the lubricating oil moves backward, and by allowing the lubricating oil to smoothly move from the differential chamber DR to the strainer chamber SR when the lubricating oil moves forward.

The present disclosure is not limited to the embodiment described above with reference to the drawings.

For example, in the embodiment described above, the transmission case 31 includes the TC-side case member 61 and the TM-side case member 62, which are joined to each other along the opening edges.

However, a housing according to the present disclosure is not limited to a housing having such a structure. The housing may be formed by joining a plurality of case members to each other along the opening edges. For example, the housing may be formed by joining three or more case members to each other along the opening edges.

In the embodiment described above, the final driven gear 42 is used as a rotating body that splashes lubricating oil from the oil sump of the differential chamber DR. However, a rotating body according to the present disclosure is not limited to the final driven gear. The rotating body may be any member that can splash the lubricating fluid from a fluid sump formed in a first chamber.

In the embodiment described above, the partition member is formed by combining the protruding portion 63a of the gasket 63, the wall portion 64b of the duct 64, and the first partition rib 62a and the second partition rib 62b of the TM-side case member 62. This is in order to easily form a lubrication structure by omitting a step of fixing the partition member.

However, a partition member according to the present disclosure is not limited to a partition member having the structure described above. The partition member may be any member that can define a first chamber and a second chamber by separating the space in the housing. For example, the partition member may be one independent member that is fixed in the housing by using a bolt or the like.

In the embodiment described above, the differential chamber DR has a substantially rectangular shape in plan view and the strainer chamber SR has a substantially L-shape in plan view.

However, the shape of a differential chamber and the shape of a strainer chamber according to the present disclosure are not limited the shapes described above. The differential chamber and the strainer chamber may have any appropriate shapes that communicate with each other in upper parts thereof. For example, a differential chamber and a strainer chamber that are line-symmetrical may be formed by dividing the space in the housing at the center of the space by using one partition member having an opening in an upper part thereof.

In the embodiment described above, the differential chamber DR and the strainer chamber SR communicate with each other through the duct 64 that is disposed so as to coincide with the driving direction of the vehicle V, and the suction inlet 65a of the strainer 65 is located closer to the differential chamber DR than the end portion of the duct 64 (that is, the second opening 64a2 in the strainer chamber SR) is.

However, a duct according the present disclosure is not limited to the one described above. The duct may be any member through which spaces divided by a partition member communicate with each other. A suction inlet of the strainer is not limited to the one described above. It is sufficient that the suction inlet is located closer to the differential chamber than an opening of the duct in the strainer chamber is. For example, the duct may be disposed so as to extend in a direction that crosses the driving direction of the vehicle.

A lubrication structure of a power transmission device (for example, a power transmission device PT in an embodiment, the same applies hereafter) according to the present disclosure is a lubrication structure for lubricating a rotating body (for example, a final driven gear 42 in the embodiment, the same applies hereafter) by immersing the rotating body in a fluid sump of lubricating fluid collected in a housing (for example, a transmission case 31 in the embodiment, the same applies hereafter) of the power transmission device. The lubrication structure includes a strainer (for example, a strainer 65 in the embodiment, the same applies hereafter) disposed in a lower part of a space in the housing; a partition member (for example, a protruding portion 63a, a wall portion 64b, a first partition rib 62a, and a second partition rib 62b in the embodiment, the same applies hereafter) that divides the space in the housing into portions; and a tubular duct (for example, a duct 64 in the embodiment, the same applies hereafter) through which the portions of the space divided by the partition member communicate with each other. The strainer includes a suction inlet (for example, a suction inlet 65a in the embodiment, the same applies hereafter) through which the lubricating fluid is suctioned from the fluid sump. The partition member defines, by dividing the space in the housing, a first chamber (for example, a differential chamber DR in the embodiment, the same applies hereafter) that contains the rotating body and a second chamber (for example, a strainer chamber SR in the embodiment, the same applies hereafter) that communicates with the first chamber through an upper part of the space in the housing and contains the strainer. The suction inlet of the strainer is located closer to the first chamber than an opening (for example, a second opening 64a2 in the embodiment, the same applies hereafter) of the duct in the second chamber is.

As described above, in the lubrication structure according to the present disclosure, the partition member divides the space in the housing into the first chamber and the second chamber. That is, the fluid sump, which is formed in the housing, is also divided into a fluid sump of the first chamber and a fluid sump of the second chamber.

Thus, lubricating fluid splashed by rotation of the rotating body is limited to lubricating fluid in the fluid sump of the first chamber. The splashed lubricating fluid not only remains in the first chamber but also is supplied to the second chamber through a communicating portion. Subsequently, the lubricating fluid supplied to the second chamber is retained in the second chamber by the partition member. As a result, compared with a case where the partition member is not provided, the height of the fluid surface of the fluid sump of the first chamber becomes lower, and the height of the fluid surface of the fluid sump of the second chamber becomes higher.

In the lubrication structure according to the present disclosure, the first chamber and the second chamber communicate with each other through the duct, and the suction inlet of the strainer is located closer to the first chamber than the opening of the duct in the second chamber is.

Thus, when the lubricating fluid moves in the housing toward one side in the driving direction of the vehicle due to, for example, application of a large braking force to the vehicle or sharp acceleration of the vehicle, an end portion of the duct becomes exposed from the fluid sump in an early stage (that is, movement of lubricating fluid from the second chamber to the first chamber via the duct is restricted in an early stage). As a result, in the second chamber, the partition member restricts movement of lubricating fluid to the first chamber to a portion behind the end portion of the duct (that is, a portion where the suction inlet of the strainer is located), and the lubricating fluid collects in the second chamber.

On the other hand, when the lubricating fluid moves in the housing toward the other side in the driving direction of the vehicle, the lubricating fluid moves smoothly from the first chamber to the second chamber without being affected by the position of the end portion of the duct. As a result, lubricating fluid in the fluid sump of the first chamber flows into the second chamber, a large amount of lubricating fluid forms a deep fluid sump in the second chamber, and therefore exposure of the suction inlet of the strainer is prevented.

Accordingly, with the lubrication structure according to the present disclosure, an immersed portion of the rotating body is reduced by lowering the height of the fluid surface of the fluid sump of the first chamber, and thereby resistance that the lubricating fluid applies to the rotating body when the rotating body splashes the lubricating fluid from the fluid sump can be suppressed.

Moreover, it is possible to prevent the suction inlet of the strainer from being exposed from the fluid sump by keeping the height of the fluid surface of the fluid sump of the second chamber high in an ordinarily situation, by restricting movement of the lubricating fluid from the second chamber to the first chamber when the lubricating fluid moves toward one side in the driving direction of the vehicle, and by allowing the lubricating fluid to smoothly move from the first chamber to the second chamber when the lubricating fluid moves toward the other side in the driving direction of the vehicle.

In the lubrication structure according to the present disclosure, preferably, the duct includes a wall portion (for example, a wall portion 64b in the embodiment, the same applies hereafter) extending in a radial direction, the housing includes a plurality of case members (for example, a TC-side case member 61 and a TM-side case member 62 in the embodiment, the same applies hereafter) that are joined to each other along opening edges thereof, a gasket (for example, a gasket 63 in the embodiment, the same applies hereafter) is held between the case members, the gasket includes a protruding portion (for example, a protruding portion 63a in the embodiment, the same applies hereafter) that protrudes from the opening edges toward an inside of the housing, and the partition member includes the wall portion of the duct and the protruding portion of the gasket.

In the case where the partition member includes the gasket and the duct, the partition member can be fixed at the same time as the gasket and the duct are attached, and a step of fixing only the partition member can be omitted. Therefore, the first chamber and the second chamber can be formed easily.

Obviously, numerous modifications and variations of the present invention are possible in light of the above teachings. It is therefore to be understood that within the scope of the appended claims, the invention may be practiced otherwise than as specifically described herein.

What is claimed is:

1. A lubrication structure of a power transmission device in a vehicle for lubricating a rotating body by immersing the rotating body in a fluid sump of lubricating fluid collected in a housing of the power transmission device, the lubrication structure comprising:
    a strainer disposed in a lower part of a space in the housing;
    a partition member that divides the space into portions; and
    a tubular duct through which the portions of the space divided by the partition member communicate with each other,
    wherein the strainer includes a suction inlet through which the lubricating fluid is suctioned from the fluid sump,
    wherein the partition member defines, by dividing the space in the housing, a first chamber that contains the rotating body and a second chamber that communicates with the first chamber through an upper part of the space in the housing and contains the strainer,
    wherein the tubular duct has a through hole that extends in a front-back direction of the vehicle from a first opening to a second opening opposite to the first opening, the first opening opening onto the first chamber, the second opening opening onto the second chamber,
    wherein the suction inlet of the strainer is located closer to the first chamber than an opening of the duct in the second chamber is, and
    wherein the suction inlet is located between the first opening and the second opening in the front-back direction.

2. The lubrication structure according to claim 1,
    wherein the duct includes a wall portion extending in a radial direction,
    wherein the housing includes a plurality of case members that are joined to each other along opening edges thereof,
    wherein a gasket is held between the case members,
    wherein the gasket includes a protruding portion that protrudes from the opening edges toward an inside of the housing, and
    wherein the partition member includes the wall portion of the duct and the protruding portion of the gasket.

3. The lubrication structure according to claim 1, wherein the front-back direction is substantially parallel to a horizontal plane.

4. The lubrication structure according to claim 1,
    wherein the tubular duct includes a tubular body having the through-hole,
    wherein the strainer is provided on a lateral surface of the tubular body, and
    wherein the suction inlet is provided at a bottom of the strainer.

5. A lubrication structure of a power transmission device, comprising:
    a housing including a bottom space to store lubricating fluid in which a rotating body is immersed to be lubricated;
    a partition dividing the bottom space into a first space in which a rotating body is provided and a second space opening to the first space;
    a tubular duct including a projection duct projecting in a projection direction from an end of the first space to the second space such that the first space and the second space communicate with each other via the tubular duct; and
    a strainer provided in the second space and including a suction inlet through which the strainer is configured to suction the lubricating fluid stored in the bottom space, the suction inlet being located between the end of the first space and a tip end of the projection duct in the projection direction,
    wherein the tubular duct includes a wall extending from the projection duct in a radial direction of the projection duct,
    wherein the housing includes case members such that opening edges of the case members are joined to each other,
    wherein a gasket is provided between the opening edges of the case members,
    wherein the gasket includes a protrusion protruding from an outer perimeter of the gasket toward an inside of the housing, and
    wherein the partition is defined by the wall of the tubular duct and the protrusion of the gasket.

6. The lubrication structure according to claim 5, wherein the first space opens to the second space through an upper space of the housing.

7. The lubrication structure according to claim 5,
    wherein the tubular duct includes a tubular body having a through-hole,
    wherein the strainer is provided on a lateral surface of the tubular body, and
    wherein the suction inlet is provided at a bottom of the strainer.

8. A lubrication structure of a power transmission device for lubricating a rotating body by immersing the rotating body in a fluid sump of lubricating fluid collected in a housing of the power transmission device, the lubrication structure comprising:
    a strainer disposed in a lower part of a space in the housing;
    a partition member that divides the space into portions; and
    a tubular duct through which the portions of the space divided by the partition member communicate with each other,
    wherein the strainer includes a suction inlet through which the lubricating fluid is suctioned from the fluid sump,
    wherein the partition member defines, by dividing the space in the housing, a first chamber that contains the rotating body and a second chamber that communicates with the first chamber through an upper part of the space in the housing and contains the strainer, wherein the suction inlet of the strainer is located closer to the first chamber than an opening of the duct in the second chamber is, wherein the duct includes a wall portion extending in a radial direction, wherein the housing includes a plurality of case members that are joined to each other along opening edges thereof, wherein a gasket is held between the case members, wherein the gasket includes a protruding portion that protrudes from the opening edges toward an inside of the housing, and wherein the partition member includes the wall portion of the duct and the protruding portion of the gasket.

* * * * *